(12) United States Patent
Matsumura (10) Patent No.: US 7,289,510 B2
(45) Date of Patent: Oct. 30, 2007

(54) METHOD AND SYSTEM FOR SWITCHING VARIABLE-LENGTH PACKETS

(75) Inventor: Kenji Matsumura, Tokyo (JP)

(73) Assignee: NEC Corporation, Tokyo (JP)

( * ) Notice: Subject to any disclaimer, the term of this patent is extended or adjusted under 35 U.S.C. 154(b) by 1034 days.

(21) Appl. No.: 10/192,582

(22) Filed: Jul. 11, 2002

(65) Prior Publication Data

US 2003/0012191 A1    Jan. 16, 2003

(30) Foreign Application Priority Data

Jul. 11, 2001    (JP) .............................. 2001-211350

(51) Int. Cl.
*H04L 12/28* (2006.01)
(52) U.S. Cl. .................... 370/395.1; 370/535; 370/474
(58) Field of Classification Search .................... None
See application file for complete search history.

(56) References Cited

U.S. PATENT DOCUMENTS 6,128,278 A * 10/2000 Joffe et al. .................. 370/229

| | | | |
|---|---|---|---|
| RE37,494 E | * | 1/2002 | Cantoni et al. .......... 370/395.6 |
| 6,574,226 B1 | * | 6/2003 | Nakano et al. ......... 370/395.64 |
| 2001/0033581 A1 | * | 10/2001 | Kawarai et al. ............ 370/468 |
| 2002/0112079 A1 | * | 8/2002 | Yamamoto .................. 709/246 |

FOREIGN PATENT DOCUMENTS

| | | |
|---|---|---|
| JP | 10-51408 | 2/1998 |
| JP | 10-294743 | 11/1998 |
| JP | 2000-31999 | 1/2000 |
| JP | 2000-151633 | 5/2000 |
| JP | 2000-232482 | 8/2000 |
| JP | 2000-332781 | 11/2002 |

* cited by examiner

*Primary Examiner*—Duc Ho
(74) *Attorney, Agent, or Firm*—Young & Thompson (57) ABSTRACT

A variable-length packet switching system of the present invention converts variable-length packets to fixed-length packets without regard to the size of the individual variable-length packets and causes a packet switch to switch such fixed-length packets at high speed. The system realizes high-speed switching by use of, e.g., an H/W scheme. Particularly, the system is free from conversion losses when converting the variable-length packets to fixed-length packets and thereby minimizes a frequency band required of the packet switch without regard to the packet size.

12 Claims, 7 Drawing Sheets

METHOD AND SYSTEM FOR SWITCHING VARIABLE-LENGTH PACKETS

BACKGROUND OF THE INVENTION

1. Field of the Invention

The present invention relates to a packet switching system and more particularly to a method and a system for switching input variable-length packets destination by destination.

2. Description of the Background Art

Conventional routers and other packet switches have relied mainly on software processing, which is low in processing speed. Today, high-speed flow detection (e.g. CAM) and high-speed fixed-length packet switching (e.g. ATM (Asynchronous Transfer Mode)) switch and crossbar switch) both of which are derived from H/W schemes are available and allow software processing to be replaced with hardware processing, promoting high-speed packet switching. However, a problem with a packet switching system using hardware processing is that a frequency band required of a packet switch is broadened, depending on the size of variable-length packets input to the system.

Technologies relating to the present invention are disclosed in, e.g., Japanese Patent Laid-Open Publication Nos. 2000-151633 and 2000-232482.

SUMMARY OF THE INVENTION

It is an object of the present invention to provide a method and a system capable of switching variable-length packets while reducing a frequency band required of a packet switch without regard to the size of variable-length packets.

In accordance with the present invention, a variable-length packet switching system converts input variable-length packets to fixed-length local packets and causes a packet switch to switch the fixed-length local packets. A flow controller selects destinations of the variable-length packets input thereto in accordance with header information attached thereto and outputs the packets together with destination information. A demultiplexer stores the variable-length packets on output destination-by-destination queues in accordance with the destination information. A pocketing controller generates header information in accordance with queue storage information representative of storage of the variable-length packets in the output destination-by-destination queues, and sends output commands to the output destination-by-destination queues at a preselected period. The output destination-by-destination queues each reads out a preselected unit size of packet data capable of being accommodated in a local packet in accordance with the header information and the output command and then outputs the preselected unit size of packet data as a fixed-length packet while attaching a read header to the preselected size of packet data. A multiplexer multiplexes fixed-length packets output from the output destination-by-destination queues to thereby feed the resulting multiplexed fixed-length packets to the packet switch.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
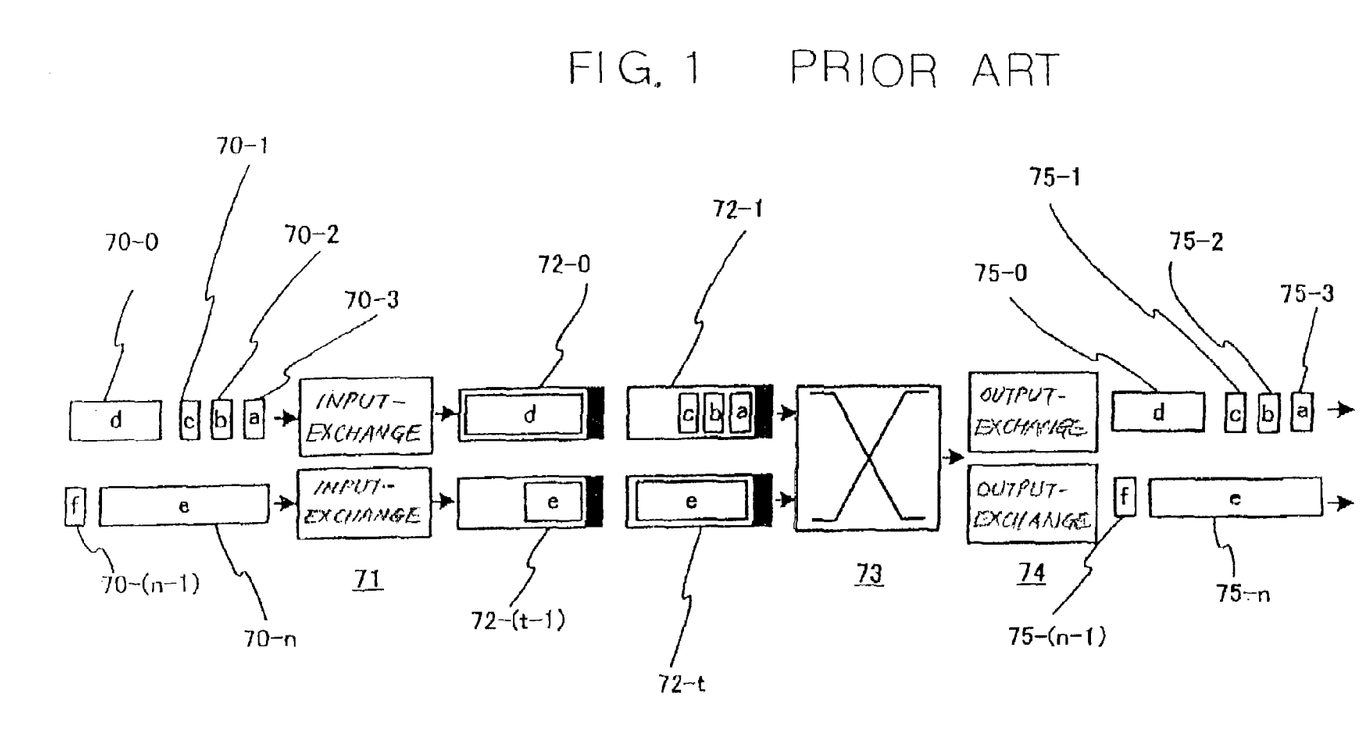
FIG. 1 is a schematic block diagram showing a conventional variable-length packet switching system using hardware processing.

To better understand the present invention, brief reference will be made to a conventional packet switching system, shown in FIG. 1. As shown, the packet switching system includes an input-exchange 71 for converting input packets 70-0 through 70-n having a variable length each and input to the system to local packets 72-0 through 72-t having a fixed length each. A packet switch 73 switches the local packets 72-0 through 72-t having the preselected length each. An output-exchange 74 again converts the packets output from the packet switch 73 to output packets 75-0 through 75-n having a variable length each.

More specifically, the input-exchange 71 divides the input packets 70-0 through 70-n to thereby convert them to the local packets 72-0 through 72-t, which are to be dealt with within the system and have a preselected length each. Having a high-speed processing capability, the packet switch 73 switches the local packets 72-0 through 72-t. The output-exchange 74 converts the switched local packets 72-0 through 72-t to thereby reconstruct the original input packets.

Generally, the input-exchange 71 assigns a single local packet to a single input packet or assigns a plurality of local packets to a single input packet (AAL2 (ATM Adaptation Layer type 2), as taught in, e.g., Japanese Patent Laid-Open Publication Nos. 10-294743 and 2000-332781. Further, the input-exchange 71 assigns a plurality of local packets to an input packet greater in size than a single local packet (AAL5). In any case, padding or similar dummy data is inserted in the unoccupied portion of a local packet.

The problem with the conventional packet switching system is that the conversion of the input packets having variable lengths to the local packets having the fixed length is not efficient, depending on the size of the input packet. Consequently, the conversion efficiency of the packet switch 73 and therefore the performance of the entire system is noticeably lowered. For example, assume that a local packet has a fixed length great enough to accommodate B bytes while an input packet has a size of B+1 bytes. Then, the conversion efficiency of the packet switch 73 is lowest, i.e., lowered to about one-half of the expected efficiency, doubling a frequency band required of the packet switch 73, as stated earlier.

Figure 2:
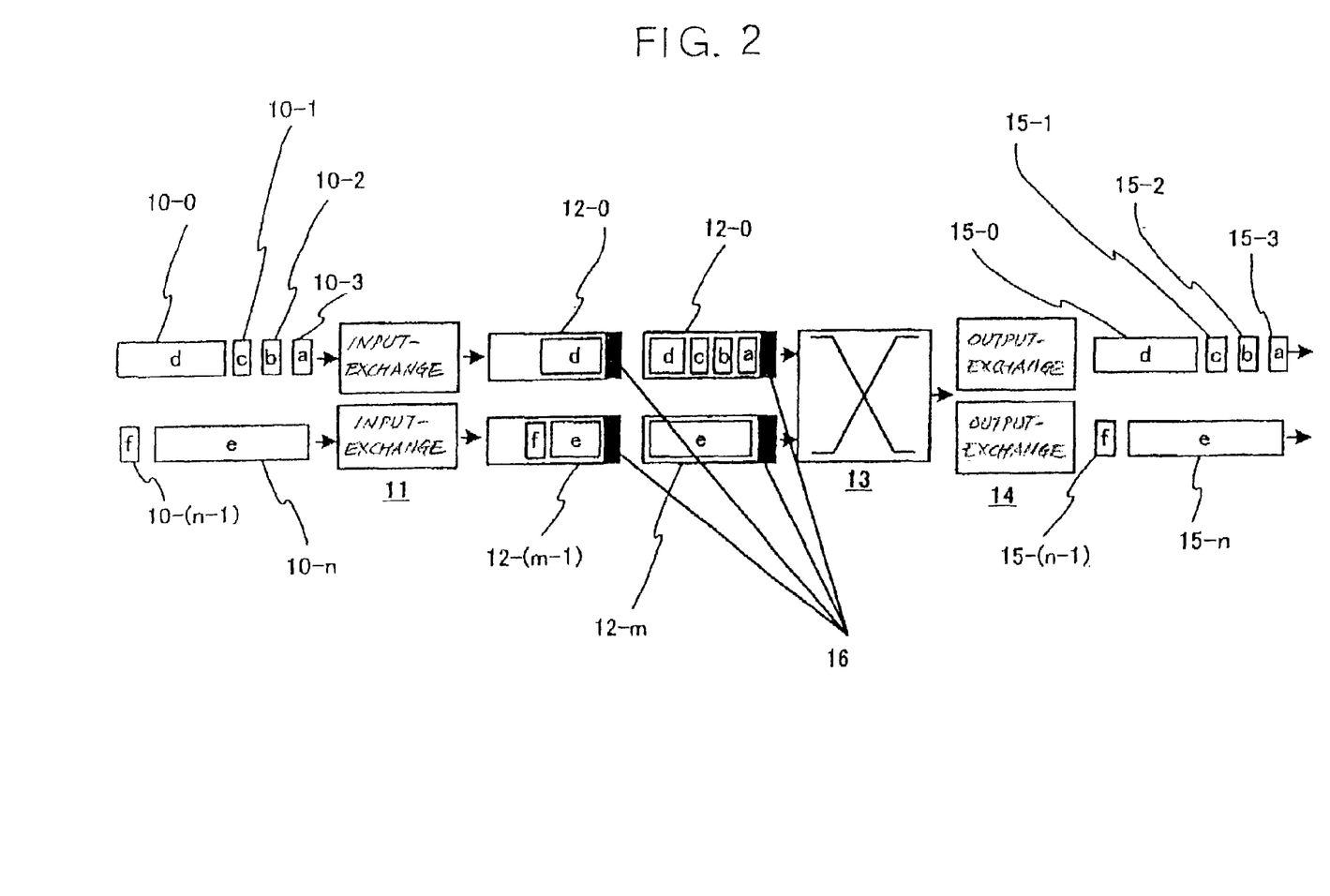
FIG. 2 is a schematic block diagram showing a variable-length packet switching system embodying the present invention.

Referring to FIG. 2, a packet switching system embodying the present invention is shown. As shown, the packet switching system includes an input exchange 11 configured to convert input packets having variable lengths to destination-by-destination local packets having a fixed length. A packet switch 13 switches the local packets. An output-exchange 14 converts the switched local packets to destination-by-destination variable-length packets.

A specific configuration of the input-exchange 11 will be described with reference to FIG. 3. As shown, the input-exchange 11 includes a flow controller 20, a demultiplexer 22, output destination-by-destination queues 23-0 through 23-n, a packeting controller 24, and a multiplexer 25. The flow controller 20 searches a forwarding table, not shown, on the basis of header information attached to the individual input packets 10-a through 10-n, FIG. 2, thereby recognizing the flows of the input packets and selecting destinations. The flow controller 20 then delivers the variable-length input packets 10-0 through 10-n to the demultiplexer 22 together with the above destination information. Further, the flow controller 20 performs policing or user parameter control flow by flow, as needed.

The demultiplexer 22 loads the output queues 23-0 through 23-n with adequate ones of the variable-length packets 10-0 through 10-n in accordance with the destination information received from the flow controller 20.

The output queues 23-0 through 23-n individually monitor the queuing of the input packets 10-1 through 10-n as well as queue storage information while informing the packeting controller 24 of such queuing conditions. Also, on receiving an output command from the packeting controller 24, the queues 23-0 through 23-n each reads out an amount of data corresponding to the size of X bytes of a local packet (local packet size), e.g., the maximum amount of data that can be packed in a local packet. At this instant, each queue adds a header to the data in accordance with header information received from the packeting controller 24 and then outputs the data together with the header to the multiplexer 25.

The packeting controller 24 generates and outputs the header information in accordance with the queue storage information received from the queues 23-0 through 23-n. Further, the packeting controller 24 sends the output command to the queues 23-0 through 23-n at a preselected period in order to command them to output the respective data. The multiplexer 25 multiplexes the local packets having the fixed length input from the queues 23-0 through 23-n.

Figure 4:
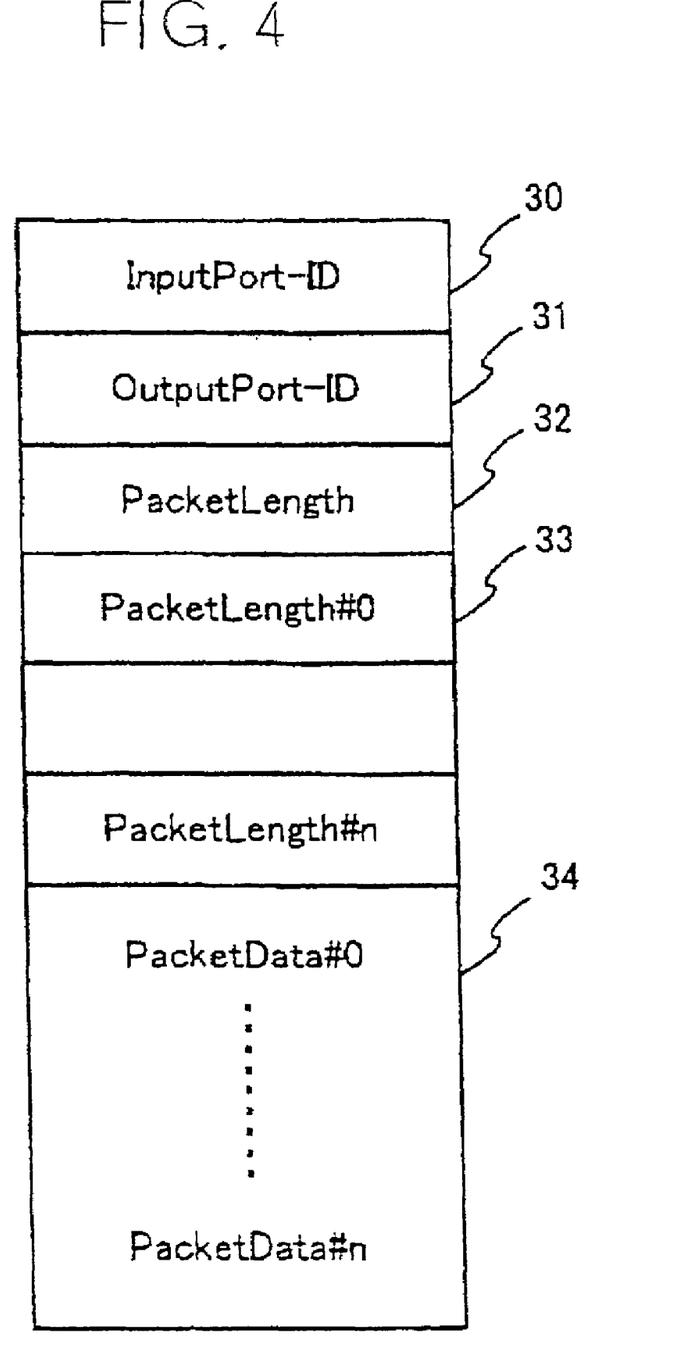
FIG. 4 shows a specific format of a local packet unique to the illustrative embodiment.

FIG. 4 shows a specific format of a single local packet having the fixed length. As shown, the format is made up of an input port-ID (identification) 30, an output port-ID 31, a packet length 32, packet lengths #0 through #n, and packet data #0 through #n. The input port-ID 30 is representative of the input port of the packet switch 13 and used when the output-exchange 14 queues the packets. The output port-ID 31 is representative of the output port of the packet switch 13 and used when the packet switch 13 switches the packets.

The packet length 32 shows the length (bytes) of valid packet data stored in a local packet. The maximum size that can be multiplexed in a single local packet is X bytes, as stated earlier. In the illustrative embodiment, when the packet length 32 is smaller than X, then the data with the packet lengths 32+1 to X are neglected. The packet lengths 33-#0 through 33-#n each are representative of the length of a particular packet multiplexed in the local packet. The packet length 33-#0 indicates that the packet with the packet length 33-#0 is divided and stored in a plurality of local packets although it lies in the range of the valid packet data length represented by the packet length 32. Further, packet data 34-#0 through 34-#n each are representative of particular packet data multiplexed together; the maximum amount of data of the packet data 34-#0 through 34-#n is equal to the local packet size X (bytes).

Figure 5:
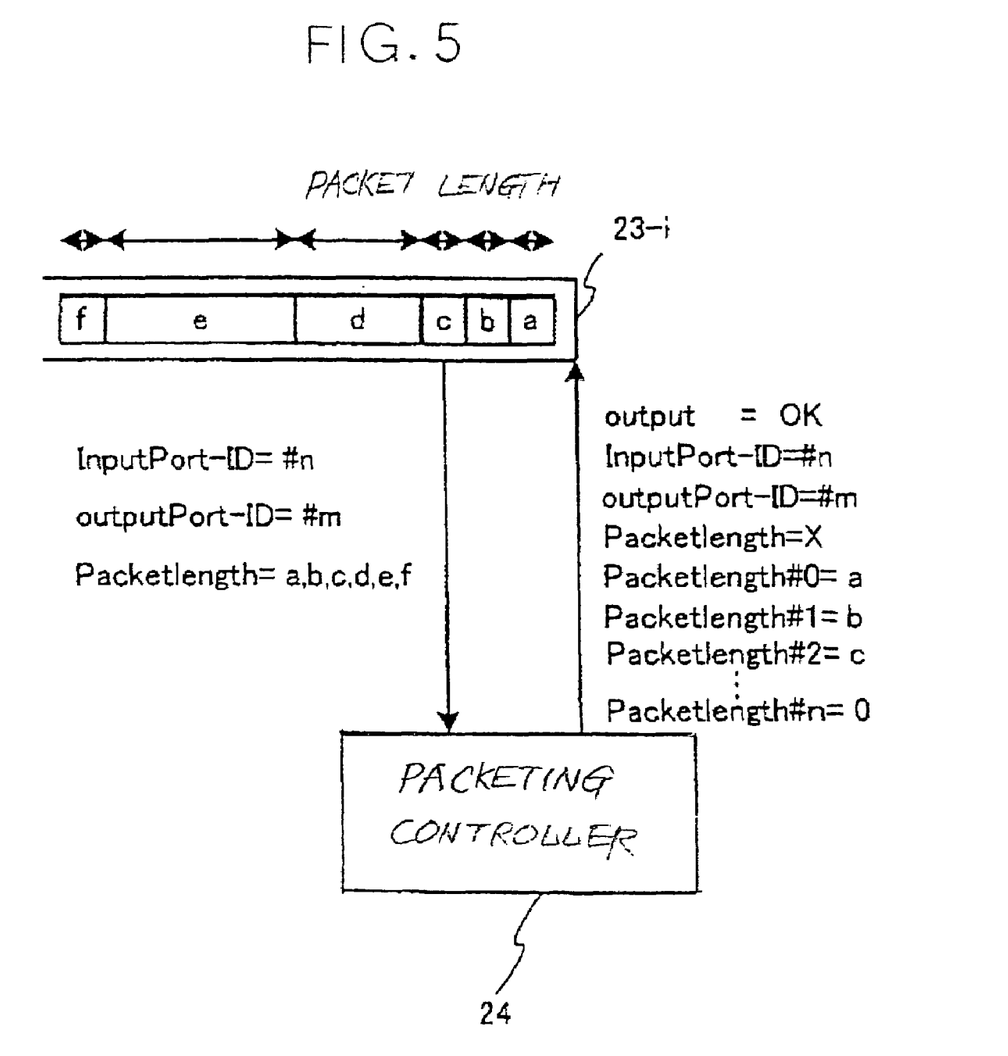
FIG. 5 demonstrates a specific operation of the input-exchange.

FIG. 5 shows the specific storage condition of a certain queue 23-i and specific header information sent from the packeting controller 24 to the queue 23-i. As shown, the queue 23-i is packed with packets respectively having packet lengths a through f and sends the input port-ID, output port-ID and packet lengths a through f to the packeting controller 24. The packeting controller 24 generates header information to be attached to the individual local packets in accordance with the received information and sends the previously mentioned output command (output=OK) to the queue 23-i at a preselected period. The header information includes the packet length 32 representative of the valid packet data length of the local packet and the packet lengths 33-#0 through 33-#n representative of the lengths of the individual multiplexed packets.

In FIG. 5, assume that the following relations hold:

$2X > a+b+c+d+e+f > X$ $a+b+c+(d-2)=X$ $2+e+f=Y<X$ $d+e+f>X$

Then, if only the packet with the packet length b is divided, two local packets are output instead of three local packets. Consequently, the packeting controller 24 generates the following header information:

packet length 32=X
packet length 33-#0=a
packet length 33-#1=b
packet length 33-#2=c
packet length 33-#3=0 and packet length 32=Y=2+e+f<X
packet length 33-#0=2
packet length 33-#1=e
packet length 33-#2=f Referring again to FIG. 2, the packet switch 13 receives the local packets 12-0 through 12-m from the input-exchange 11 and performs switching by referencing the output port-IDs included in the local packet headers. The packet switch 13 then delivers the switched local packets 12-0 through 12-m to the output-exchange 14. While the packet switch 13 is often implemented as a high speed, low cost crossbar switch, use may be made of any one of conventional packet switches including ATM packet switches.

Figure 6:
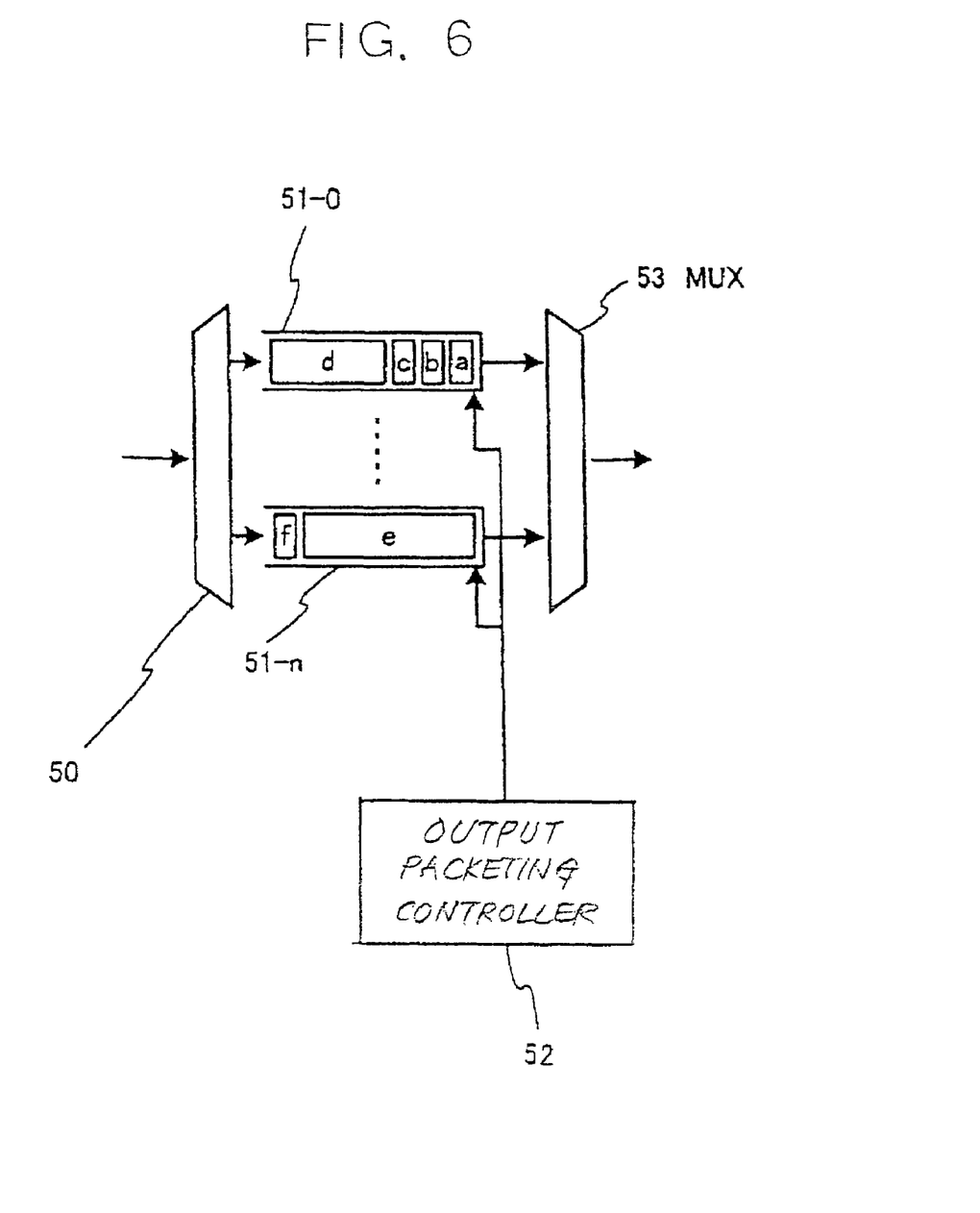
FIG. 6 is a schematic block diagram showing a specific configuration of an output-exchange also included in the illustrative embodiment.

Reference will be made to FIG. 6 for describing a specific configuration of the output-exchange 14. As shown, the output-exchange 14 includes a demultiplexer 50, input destination-by-destination queues 51-0 through 51-n, a packeting controller 52, and a multiplexer 53. The demultiplexer 50 loads each of the local packets received from the packet switch 13 on a particular queue 51 by referencing the input-port ID 30 of the header attached to the local packet.

The input queues 51-0 through 51-n report queuing information and header information relating to the packets of the local packets to packeting controller 52. Also, on receiving an output command from the packeting controller 52, the queues 51-0 through 51-n each reads out an amount of data corresponding to A bytes of data to be sent together.

The packeting controller 52 monitors the reconstruction of the input packets on the basis of local packet header information received from the queues 51-0 through 51-n. If any one of the local packets satisfies the valid length represented by the packet length 32 and if the packet of the local packet designated by the packet length 33-n is "1" or above, then the packeting controller 52 determines that the packets of the local packet have been fully reconstructed. The packeting controller 52 then sends an output command to the queue storing the above local packet. On the other hand, assume that the local packet satisfies the packet length 32, but the packet length 33-n is "0", meaning that the original packet data is divided and stored in two consecutive local packets. In this case, the packeting controller 52 waits until the header information of the next local packet satisfies the packet length 32 and the packet length 33-n increases to "1" or above. Further, the packeting controller 52 sequentially sends output commands and packet length sizes to the queues 51-0 through 51-n, so that the input packets fully reconstructed are sequentially output.

The multiplexer 53 multiplexes the local packets received from the input destination-by-destination queues 51-0 through 51-n.

A specific operation of the illustrative embodiment will be described with reference to FIG. 2. Assume that packets having variable lengths a through f are input via an interface, and that the packet lengths a through f have the following relations with the local packet size X (bytes):

$$2X > a+b+c+d+e+f > X$$

$$a+b+c+(d-2)=X$$

$$d+e+f > X$$

$$2+e+f=Y<X$$

Further, assume that all the packets are input via a port #m and then output via a port #n. Then, the flow controller 20 determines that all the packets are to be output via the output port #n of the packet switch 13 by searching the forwarding table. As a result, all the packets are packed in the queue 23-n via the demultiplexer 22. The queue 23-n sends the packet lengths a through f of the packets stored therein and the input and output ports of the packet switch 13 to the packeting controller 24.

The packeting controller 24 generates headers to be attached to the individual local packets on the basis of the received information. In this specific case, not three local packets, but two local packets are produced because of the above relation between the packet lengths. Therefore, the packeting controller 24 outputs the following header information:

[Header Information for the First Packet]
 packet length 32=X
 packet length 33-0=a
 packet length 33-1=b
 packet length 33-2=c
 packet length 33-3=0

[Header Information for the Second Packet]
 packet length 32=Y=2+e+f<X
 packet length 33-0=2
 packet length 33-1=e
 packet length 33-2=f The packeting controller 24 sends the above header information to the queue 23-n together with an output command to thereby cause the queue 23-n to output the two local packets to the packet switch 13. The packet switch 13 switches the two local packets by referencing the output port-IDs included in the headers of the local packets 12-0 through 12-n. Therefore, the two local packets are output to the output port #n.

On receiving the two local packets, the output-exchange 14 demultiplexes them on the basis of the input port-IDs of the local packets and feeds them to the queue 51-n. At the same time, the output-exchange 14 delivers the header information of the two local packets to the packeting controller 52.

When the header information of the first one of the two local packets is input to the packeting controller 52, the packeting controller 52 sees, based on packet length 32=X and packet length 33-n>0, that three packets a through c are reconstructed. The packeting controller 52 therefore sends an output command to the queue 51-n for causing it to output the three packets a through c. As for the fourth packet with the packet length 32=X and packet length 33-#3=0, the packeting controller 52 determines that the fourth packet is divided, and therefore does not deliver an output command to the queue 51-n at this time. On receiving the header information of the next local packet with packet length 32=Y and packet length 33-#0=2, the packeting controller 52 sees that the packets e and f with the length d are also reconstructed, and sends an output command meant for the third packet to the queue 51-n.

With the above procedure, the illustrative embodiment can reduce the frequency band required of the packet switch without regard to the size of the variable-length packet.

Specific modifications of the illustrative embodiment will be described hereinafter. While the illustrative embodiment indicates the lengths of the individual local packets by using the packet lengths 33-#0 through 33-#n shown in FIG. 4, it may alternatively indicate them by use of pointers. For example, pointers "0" and "N" may be respectively assigned to the first data of the packet data #0 and the last data of the packet data #n, in which case the first pointer values of the individual packet data will be stored in the packet lengths 33-#0 through 33-#n.

Figure 7:
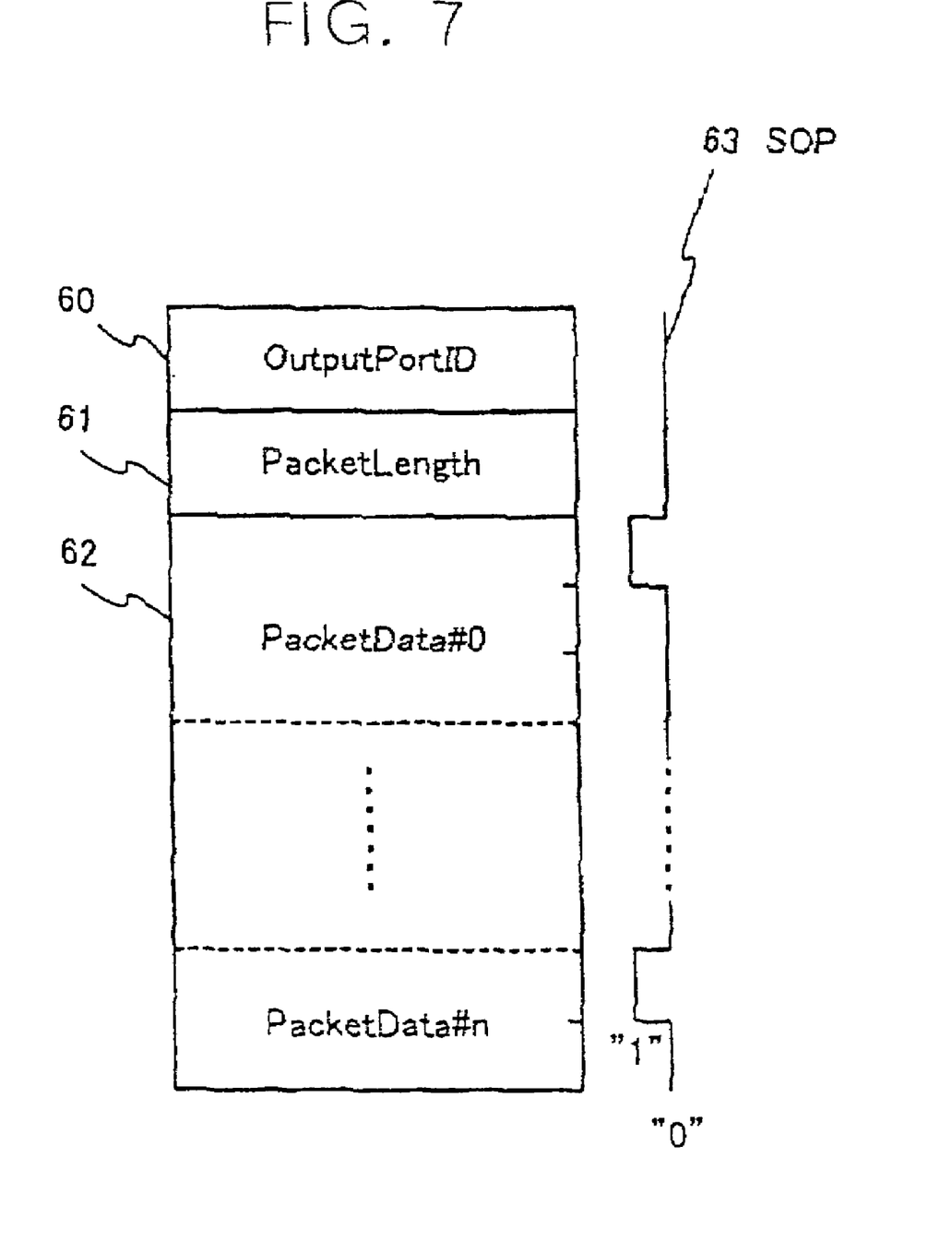
FIG. 7 shows another specific format of a local packet unique to the illustrative embodiment.

In the illustrative embodiment, each local packet shows the packet lengths of the packets to be multiplexed, as stated with reference to FIG. 4. A problem with this scheme is that when the number of packets to be multiplexed is increased, the header information of the local packet and therefore an overhead increases, obstructing the efficient use of the entire system and thereby broadening the necessary frequency band. FIG. 7 shows a specific solution to this problem that does not show the packet lengths of packets to be multiplexed in the local packet. As shown, one-bit data SOP (Start of Packet) running together with the local packet is defined. The logical value of the data SOP is ONE at the head of the multiplexed packets and is ZERO at the other portions of the multiplexed packets. This makes it unnecessary to broaden the necessary frequency band by indicating the head of the multiplexed packets.

Figure 3:
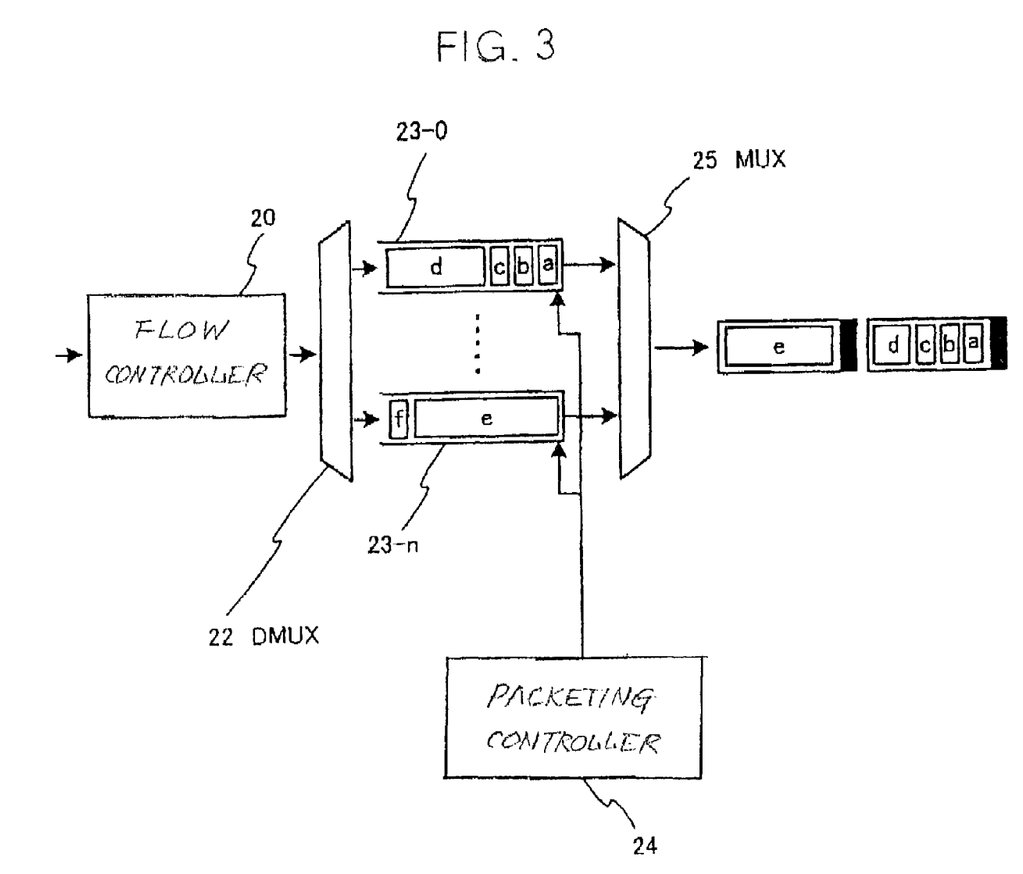
FIG. 3 is a schematic block diagram showing a specific configuration of an input-exchange included in the illustrative embodiment.

The queues 23-0 through 23-n, FIG. 3, and the queues 51-0 through 51-n, FIG. 6, perform simple queuing in accordance with the output destinations and input destinations, respectively. In this configuration, all the packets are handled equally to each other. Alternatively, the queues may be classified on an input/output destination basis or a QOS (Quality of Service) or similar class basis so as to give the concept of a class to each packet, thereby classifying the packets by priority.

Assume that any one of the fixed-length local packets output to the packet switch includes divided part of a variable-length packet. Then, the packet data of the queue assigned to a particular destination and including the other half of the above variable-length packet may be read out together with the subsequent packet data in a preselected data size. Further, when the amount of the packet data is short of the preselected size, the remaining packet data may also be read out at a preselected period and then output to the packet switch as a fixed-length packet together with a header. Moreover, a header attached to a fixed-length packet may include the total length of multiplexed valid packet data, data indicative of division and substituted for the data-by-data packet lengths of the individual packet data and the data length of the divided packet data. In addition, independent header information may be inserted to identify the divided packet data.

In summary, in accordance with the present invention, a variable-length packet switching system converts variable-length packets to fixed-length packets without regard to the original sizes of the variable-length packets and causes a packet switch to switch such fixed-length packets at high speed. The system therefore realizes high-speed switching by use of, e.g., the H/W scheme. Particularly, the system is free from conversion losses when converting the variable-length packets to fixed-length packets and thereby minimizes a frequency band required of the packet switch without regard to the packet size.

Further, the system of the present invention uses pointers to identify the variable-length packets constituting a local packet or uses one-bit data to identify the head of the packet data and identify the following data. This prevents header information from increasing and therefore enhances the efficient operation of the system.

Various modifications will become possible for those skilled in the art after receiving the teachings of the present disclosure without departing from the scope thereof.

What is claimed is:

1. A variable-length packet switching method for converting input variable-length packets to fixed-length local packets and causing a packet switch to switch said fixed-length local packets, said variable-length packet switching method comprising the steps of:
sequentially storing particular variable-length packets in each of a plurality of output destination-by-destination queues in accordance with header information attached to said variable-length packets;
reading, based on queue storage information output from a respective output destination-by-destination queue, a maximum amount of packet data in a local packet out of said respective output destination-by-destination queue at a preselected period as a fixed-length local packet;
attaching a header to the fixed-length local packet to produce multiplexed packet data; and
feeding the multiplexed packet data to the packet switch.

2. The method in accordance with claim 1, further comprising the steps of:
sequentially storing the fixed-length local packets in the multiplexed packet data output from the packet switch in a plurality of input destination-by-destination queues;
reconstructing the variable-length packets from the stored fixed-length local packets; and
outputting said variable-length packets in accordance with header information output from a respective one of said input destination-by-destination queues.

3. The method as claimed in claim 1, wherein the header attached to each said fixed-length local packet includes a total length of the valid multiplexed packet data and pointer values each designating particular multiplexed packet data.

4. The method as claimed in claim 3, further comprising the steps of:

sequentially storing the fixed-length local packets in the multiplexed packet data output from the packet switch in a plurality of input destination-by-destination queues;
reconstructing the variable-length packets from the stored fixed-length local packets; and
outputting said variable-length packets in accordance with header information output from a respective one of said input destination-by-destination queues.

5. The method as claimed in claim 1, wherein the header attached to each said fixed-length local packet includes a total length of valid said multiplexed packet data, and
one-bit data, which runs together with the multiplexed packet data, is used to identify preceding data and following data on a bit basis for thereby distinguishing the multiplexed packet data of the fixed-length local packet.

6. The method as claimed in claim 5, further comprising the steps of:
sequentially storing the fixed-length local packets in the multiplexed packet data output from the packet switch in a plurality of input destination-by-destination queues;
reconstructing the variable-length packets from the stored fixed-length local packets; and
outputting said variable-length packets in accordance with header information output from a respective one of said input destination-by-destination queues.

7. A variable-length packet switching system for converting input variable-length packets to fixed-length local packets and causing a packet switch to switch said fixed-length local packets, said variable-length packet switching system comprising:
a flow controller configured to select destinations of variable-length packets input thereto in accordance with header information attached to said variable-length packets and output said variable-length packets together with destination information;
a demultiplexer configured to store the variable-length packets on output destination-by-destination queues in accordance with the destination information;
a packeting controller configured to generate header information in accordance with queue storage information representative of storage of said variable-length packets in said output destination-by-destination queues, and send output commands to said output destination-by-destination queues at a preselected period, wherein said output destination-by-destination queues each reads out a preselected unit amount of packet data in a local packet in accordance with the header information and the output command and then outputs said preselected unit amount of packet data as a fixed-length local packet while attaching a read header to said preselected unit amount of packet data; and
a multiplexer configured to multiplex fixed-length local packets output from said output destination-by-destination queues to thereby feed resulting multiplexed fixed-length local packets to the packet switch.

8. The system as claimed in claim 7, further comprising:
a demultiplexer configured to load the multiplexed fixed-length local packets output from the packet switch on input destination-by-destination queues in accordance with the header information;
an output packeting controller configured to monitor reconstruction of the fixed-length local packets by referencing header information output from said input destination-by-destination queues and send an output command for causing the variable-length packets fully reconstructed to be output, wherein said input destination-by-destination queues each reads data of a variable packet length and outputs the variable-length packet in response to said output command; and a multiplexer configured to multiplex the variable-length packets for thereby outputting multiplexed variable-length packets.

9. The system as claimed in claim 7, wherein the header attached to each said fixed-length local packet includes a total length of the valid multiplexed packet data and pointer values each designating particular packet data.

10. The system as claimed in claim 9, further comprising:

a demultiplexer configured to load the multiplexed fixed-length local packets output from the packet switch on input destination-by-destination queues in accordance with the header information;

an output packeting controller configured to monitor reconstruction of the fixed-length local packets by referencing header information output from said input destination-by-destination queues and send an output command for causing the variable-length packets fully reconstructed to be output, wherein said input destination-by-destination queues each reads data of a variable packet length and outputs the variable-length packet in response to said output command; and a multiplexer configured to multiplex the variable-length packets for thereby outputting multiplexed variable-length packets.

11. The system as claimed in claim 7, wherein the header attached to each said fixed-length local packet data includes a total length of valid multiplexed packet data, and one-bit data, which runs together with the packet data, is used to identify preceding data and following data on a bit basis for thereby distinguishing the multiplexed packet data of the fixed-length local packet.

12. The system as claimed in claim 11, further comprising:

a demultiplexer configured to load the multiplexed fixed-length local packets output from the packet switch on input destination-by-destination queues in accordance with the header information;

an output packeting controller configured to monitor reconstruction of the fixed-length local packets by referencing header information output from said input destination-by-destination queues and send an output command for causing the variable-length packets fully reconstructed to be output, wherein said input destination-by-destination queues each reads data of a variable packet length, and outputs the variable-length packet in response to said output command; and a multiplexer configured to multiplex the variable-length packets for thereby outputting multiplexed variable-length packets.

\* \* \* \* \*